United States Patent
Xiong et al.

(10) Patent No.: US 9,483,738 B2
(45) Date of Patent: Nov. 1, 2016

(54) TOPIC MODEL BASED MEDIA PROGRAM GENOME GENERATION

(71) Applicant: Hulu, LLC, Santa Monica, CA (US)

(72) Inventors: Tao Xiong, Beijing (CN); Wei Wang, Beijing (CN); Guoxin Zhang, Beijing (CN); Zhibing Wang, Beijing (CN)

(73) Assignee: HULU, LLC, Santa Monica, CA (US)

( * ) Notice: Subject to any disclaimer, the term of this patent is extended or adjusted under 35 U.S.C. 154(b) by 348 days.

(21) Appl. No.: 14/157,800

(22) Filed: Jan. 17, 2014

(65) Prior Publication Data
US 2015/0206062 A1 Jul. 23, 2015

(51) Int. Cl.
*G06N 7/00* (2006.01)
*G06F 17/30* (2006.01)
*G06F 17/27* (2006.01)

(52) U.S. Cl.
CPC ......... *G06N 7/005* (2013.01); *G06F 17/30707* (2013.01); *G06F 17/30817* (2013.01); *G06F 17/277* (2013.01)

(58) Field of Classification Search
None
See application file for complete search history.

(56) References Cited

U.S. PATENT DOCUMENTS

| | | | | |
|---|---|---|---|---|
| 6,651,058 | B1* | 11/2003 | Sundaresan | G06F 17/30734 |
| 8,285,719 | B1* | 10/2012 | Long | G06N 7/005 707/737 |
| 2008/0319973 | A1* | 12/2008 | Thambiratnam | G06F 17/30616 |
| 2009/0083332 | A1* | 3/2009 | Datta | G06K 9/6263 |
| 2009/0216696 | A1* | 8/2009 | Downs | G06F 17/30675 706/20 |
| 2010/0153324 | A1* | 6/2010 | Downs | G06F 17/2745 706/21 |
| 2011/0320454 | A1* | 12/2011 | Hill | G06F 17/30265 707/739 |
| 2013/0081056 | A1* | 3/2013 | Hu | G06F 17/30705 719/313 |

OTHER PUBLICATIONS

Xing Yi et al., "A Comparative Study of Utilizing Topic Models for Information Retrieval", Center for Intelligent Information Retrieval, Department of Computer Science, University of Massachusetts, Amherst, MA, ECIR 2009, LNCS 5478, pp. 29-41.

* cited by examiner

*Primary Examiner* — Stanley K Hill
*Assistant Examiner* — Mikayla Chubb
(74) *Attorney, Agent, or Firm* — Fountainhead Law Group P.C.

(57) ABSTRACT

In one embodiment, a method defines information for a set of genomes where the set of genomes describe characteristics of media programs. The method also defines which genomes in the set of genomes correspond to which topics in a set of topics. Textual information for a plurality of media programs and the information are input into a model and the model is trained to determine a probability distribution of terms for the set of topics based on analyzing the textual information and the genome information. The method then outputs the trained model. The probability distribution of terms is usable to determine genomes for each of the plurality of media programs where a genome corresponds to a topic and is associated with a media program based on terms found in the textual information for the media program and the probability distribution of terms for the topic correspond to the genome.

23 Claims, 8 Drawing Sheets

| | Video #1 | Video #2 | ... | Video #N |
|---|---|---|---|---|
| Action | 0.56 | 0.03 | ... | 0.26 |
| Adventure | 0.31 | 0.12 | ... | 0.68 |
| ... | ... | ... | ... | ... |
| Western | 0.01 | 0.72 | ... | 0.00 |

FIG. 5B

TOPIC MODEL BASED MEDIA PROGRAM GENOME GENERATION

BACKGROUND

A media program genome includes words or phrases that reflect salient characteristics of a media program, such as a television show or movie. The genome may not be just a tag or a keyword because the genome is well-defined and also synonyms have been removed.

The genome can reflect different aspects of characteristics. For example, the aspects may be divided into factual aspects and semantic aspects. Factual aspects may not be very relevant to the storyline of the media program, but rather present factual information related to the media program, such as the actor, director, studio, language, awards, production country, release year, source, and so on. The semantic aspects may be more relevant to the storyline, such as comments, genre, mood, story time period, location, plot, property, score, and so on.

For each aspect, a company may define some words or phrases as the genome. For example, for the genre aspect, the words or phrases of Action, Animation, Drama, Comedy, Western, and Documentary are assigned to the genre aspect. Each word may be a genome and within each genome, terms may be assigned for the genome, such as Action is associated with the terms "action" and "feats". The process of assigning words for the genome may be a manual process and subject to subjective views of the assigner.

SUMMARY

In one embodiment, a method defines information for a set of genomes where the set of genomes describe characteristics of media programs. The method also defines which genomes in the set of genomes correspond to which topics in a set of topics. Textual information for a plurality of media programs and the information for the set of genomes are input into a model and the model is trained to determine a probability distribution of terms for the set of topics based on analyzing the textual information and the information for the set of genomes. The method then outputs the trained model. The probability distribution of terms is usable to determine genomes for each of the plurality of media programs where a genome corresponds to a topic and is associated with a media program based on terms found in the textual information for the media program and the probability distribution of terms for the topic correspond to the genome.

In one embodiment, a non-transitory computer-readable storage medium contains instructions, that when executed, control a computer system to be configured for: defining information for a set of genomes, the set of genomes describing characteristics of media programs; defining which genomes in the set of genomes correspond to which topics in a set of topics; inputting textual information for a plurality of media programs and the information for the set of genomes into a model; training the model to determine a probability distribution of terms for the set of topics based on analyzing the textual information and the information for the set of genomes; and outputting the trained model, wherein the probability distribution of terms is usable to determine genomes for each of the plurality of media programs, wherein a genome corresponds to a topic and is associated with a media program based on terms found in the textual information for the media program and the probability distribution of terms for the topic corresponding to the genome.

In one embodiment, an apparatus includes: one or more computer processors; and a non-transitory computer-readable storage medium comprising instructions, that when executed, control the one or more computer processors to be configured for: defining information for a set of genomes, the set of genomes describing characteristics of media programs; defining which genomes in the set of genomes correspond to which topics in a set of topics; inputting textual information for a plurality of media programs and the information for the set of genomes into a model; training the model to determine a probability distribution of terms for the set of topics based on analyzing the textual information and the information for the set of genomes; and outputting the trained model, wherein the probability distribution of terms is usable to determine genomes for each of the plurality of media programs, wherein a genome corresponds to a topic and is associated with a media program based on terms found in the textual information for the media program and the probability distribution of terms for the topic corresponding to the genome.

The following detailed description and accompanying drawings provide a better understanding of the nature and advantages of particular embodiments.

BRIEF DESCRIPTION OF THE DRAWINGS

FIG. 5B shows a chart an example of the joint distribution of genomes and shows according to one embodiment.

DETAILED DESCRIPTION

Described herein are techniques for a genome generation system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments use a constrained topic model to generate a genome for media programs. The system uses a topic model that determines a probability distribution of terms for topics found in the media programs. Then, the system determines a number of topics for each media program based on the trained topic model. For example, the system uses a term frequency for terms found in the media programs to rank the topics for each media program. The top ranked topics are then considered the genomes for each media program.

System Overview

Figure 1:
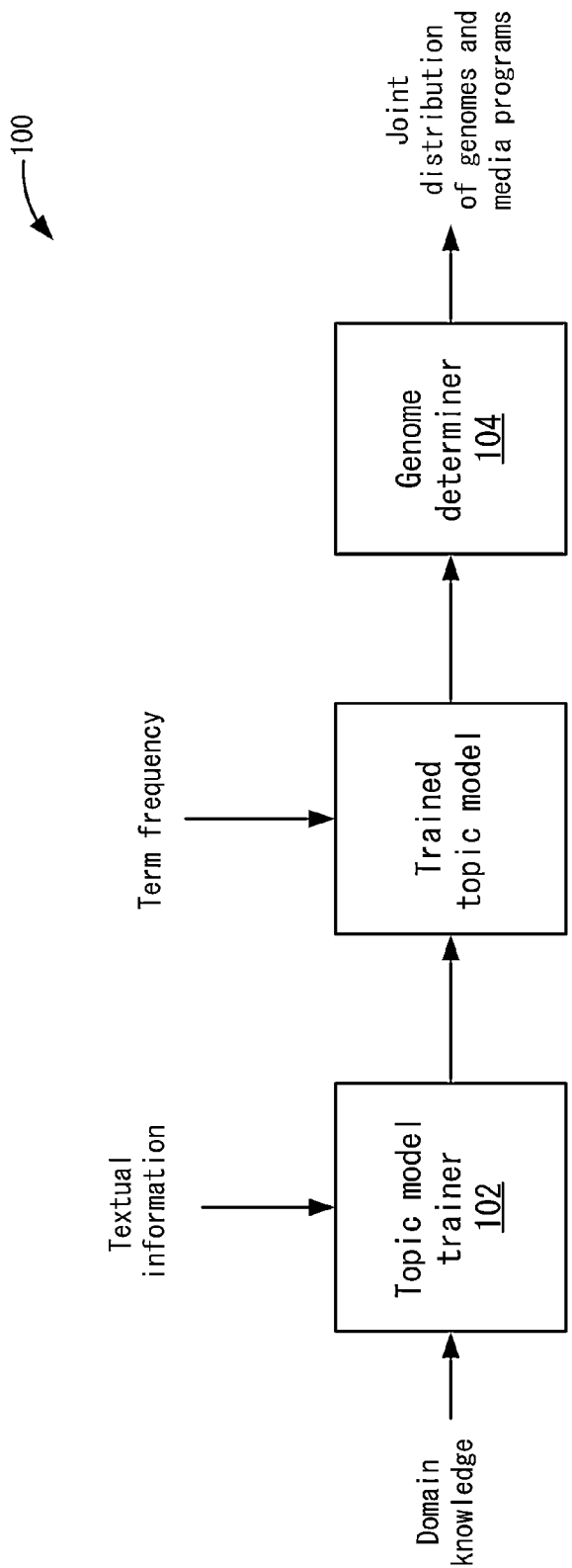
FIG. 1 depicts a simplified system for generating a genome according to one embodiment.

FIG. 1 depicts a simplified system 100 for generating genomes according to one embodiment. System 100 includes a topic model trainer 102 and a genome determiner 104. Topic model trainer 102 may receive information for media programs and domain knowledge (e.g., keywords for genomes), and output a trained topic model. The media program information may be textual information about various media programs, which may include storylines, captions, comments about the media program, a synopsis of the media program, or other relevant information for the media program. In one example, the media program is a video and the textual information is a synopsis of the storyline, comments from users, a transcript of the dialogue, etc. Topic model trainer 102 receives the textual information and genome keywords, and trains the topic model.

Genome determiner 104 receives the trained topic model and outputs a genome-media program joint distribution. As discussed above, the genome may include words or phrases that reflect characteristics of the media program. In one embodiment, one genome for a media program is expressed as one topic determined by the trained topic model. The media program may also be associated with multiple genomes. The trained topic model may output a probability distribution for terms (e.g., word or phrase) found in the topic. For example, the topic of "Action" may be associated with the words action, feats, fight, violence, chase, struggle, etc. The topic model includes a probability distribution for the words in the topic. The probability distribution assigns a probability for each word or term in the topic. As discussed above, the genome may be a word or a phrase. The genome's concept can be expressed by the terms in its corresponding topic. Genome determiner 104 then takes a term frequency (e.g., a number of times a word or phrase occurs in the media program) in each media program and applies the term frequency to the trained topic model. This scores or ranks the topics with respect to each media program. For example, if a media program includes a term that is used a lot, and that term is mainly in the Action topic, then the Action topic may be highly rated. Then, genome determiner 104 determines the top-rated topics for each media program based on the applying of the term frequency to the trained topic model. The topics can be related to the genomes for the media program. Thus, the top-rated topics are the genome for the media program. In one embodiment, genome determiner 104 determines a joint probability distribution function of media programs and genomes as will be described in more detail below. For the joint probability function, given at least two random variables X, Y, . . . , that are defined on a probability space, the joint probability distribution for X, Y, . . . is a probability distribution that gives the probability that each of X, Y, . . . falls in any particular range or discrete set of values specified for that variable. In this case, the random variables may be the media program and genome.

To train the topic model, a corpus may be input into the model. The corpus may be several documents. In one embodiment, each document D may correspond to a media program. For example, a description of the media program includes textual information that may be a word combination. Each word W may be considered an element of the document. Also, each media program may have a different description based on the media program. For example, a movie #1 has a different description of actors and plot than a movie #2. Topic model trainer 102 then trains the topic model to determine topics T for the corpus. The trained topic model extracts latent topic structures of the corpus. The topics are latent in that they are not explicitly defined in the documents. For example, topic model trainer 102 makes use of word co-occurrence in each document to train the model. The trained topic model may be viewed as a soft clustering of documents into several topics. A document may also spread to more than one cluster. For example, a document contains several words and the document's content may contain multiple topics. A topic expresses the meaning of the document and a document may have more than one topic. Also, a topic is composed by some related words. That is, a topic is a probability distribution of unique words in the corpus.

To generate the genomes for each media program, certain requirements and assumptions are used. For example, a media program corresponds to a document and genomes correspond to specific topics. The media program is a probability distribution of topics then. Particular embodiments specify certain information such that the topic model may be used to generate the genomes. For example, in the genome generation, topic model trainer 102 may specify the genome-topic correspondence, specify which words should or should not have a high probability in a specific topic, and prevent small topics from being subsumed by large topics. The training of the topic model combines the three requirements above, which can be used to generate the genomes for the media programs. In training the topic model, topic model trainer 102 may receive a specification of words that are included in a topic. Also, topic model trainer 102 may receive a specification of words that must co-occur in the same topic or cannot occur in the same topic. This uses domain knowledge to generate the genome. Further, the topic size is adaptive to the corpus. For example, a small topic may correspond to a small concept, such as high school volleyball championship. The small topic may contain only 10 words with 30 occurrences in the corpus in total. Another very big topic may be the World Cup of Soccer, which contains more than 100 words with more than 1000 occurrences in the corpus in total. If different topics are assumed to have similar size, this assumption enforces the words from large concept to leak into the small concepts. This phenomenon is that small topic can be submerged by large topic. However, in particular embodiments, this restriction can be removed by importing more relaxation in the topic model as described below.

The above allows topic model trainer 102 to output a trained topic model that can be used to determine the genomes for media programs. For example, the trained topic model provides a probability distribution of terms for topics. Then, genome determiner 104 may determine the highest ranked topics for each media program. For example, based on the term frequency found in each document associated with a media program, genome determiner 104 may score each term in the topics based on term frequency for each media program. Then, genome determiner 104 may normalize the result and take the top number of topics based on the scores for each media program. The topics associated with each media program constitute the genomes for the media program. In one embodiment, the scores between topics and the media programs provide a joint distribution of media programs and genomes.

The output of genome determiner 104 may provide the joint probability distribution that a genome belongs to the media program. This joint probability distribution may be used to provide various services. For example, the joint probability distribution the genome applies to the media program may be used in personalization, recommendation, and search. For example, if a company providing a service for sending media programs to users would like to have a group or tray on the website associated with the genre Action, the company may determine the top ten videos that have the highest probability of having the genome Action. These videos are displayed in the tray. Using the genome, the videos displayed may the highest probability of being relevant to the genre Action.

Model Training

Figure 2:
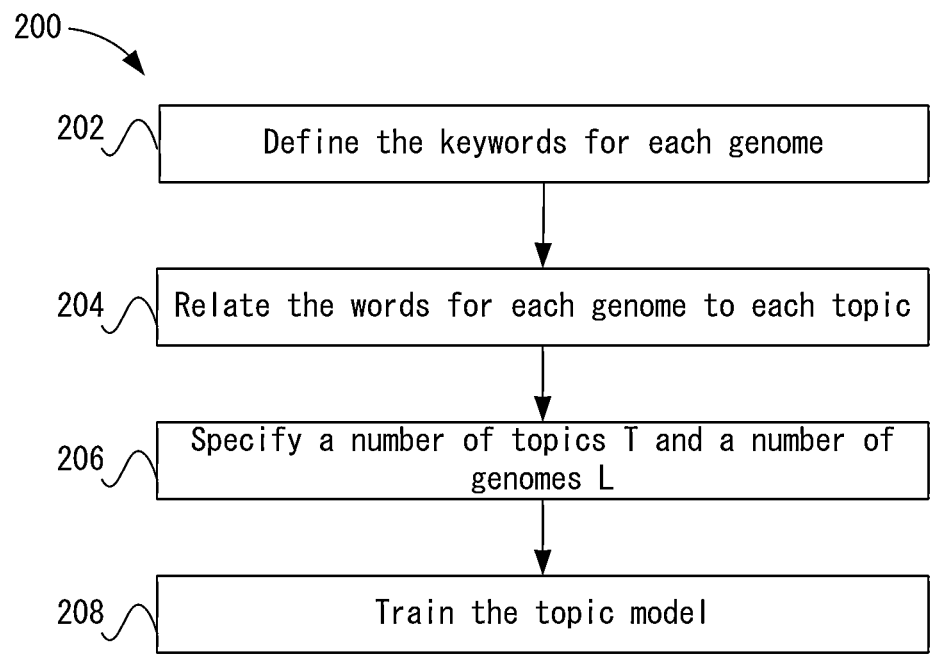
FIG. 2 depicts a simplified flowchart of a method for training the topic model according to one embodiment.

FIG. 2 depicts a simplified flowchart 200 of a method for training the topic model according to one embodiment. At 202, topic model trainer 102 receives the keywords for each genome. For example, topic model trainer 102 may receive input from a user that specifies keywords that are related to each genome. The keywords may be determined based on domain knowledge, which may be knowledge a company gleans from providing the company's service for sending videos or media programs to users. For example, the keywords of action may be related to the genre Action, the keyword adventurous may be related to the genre Adventure, etc. These words are some initial terms for the genome corresponded topic. Setting some initial terms helps the topic model find all the terms that related to the genome in the topic. Further, using domain knowledge to specify the keywords may provide more accurate training of the topic model for the purpose desired. That is, the trained topic model finds terms that are considered more related to the topic based on the specified terms due to the use of domain knowledge.

At 204, topic model trainer 102 relates the words for each genome to each topic. This relates a genome to a topic. For example, the words defined in 202 for each genome are associated with a topic. In one embodiment, topic model trainer 102 may receive input from a user that relates the words of each genome to a topic. The relationship may be determined based on domain knowledge, such as a company may determine the topics and also the relationship of topics to genomes based on its knowledge of sending videos to users.

At 206, topic model trainer 102 specifies a number of topics T and a number of genomes L. In one embodiment, the topic number T should be larger than the genome number L. This means that there may be more topics found than genomes that are defined for all media programs. That is, even though a probability distribution of 50 topics is associated with a video, only 30 of the topics are used in the genome for the video. This is because not all words occur in the textural information are related to the defined genomes. One example is the common words or functional words. Additional topics may act as a place to carry other words.

At 208, topic model trainer 102 trains the topic model. For example, topic model trainer 102 receives the textual information for media programs as input to the topic model. Topic model trainer 102 may find new topics and also use the specified topics. The output from the topic model is a trained topic model that includes a probability distribution of terms for topics found in the textual information. The probability distribution of terms in the topics includes a word distribution for each topic. One word may occur in several topics since it may contain different meanings, such as 'apple'.

Figure 3:
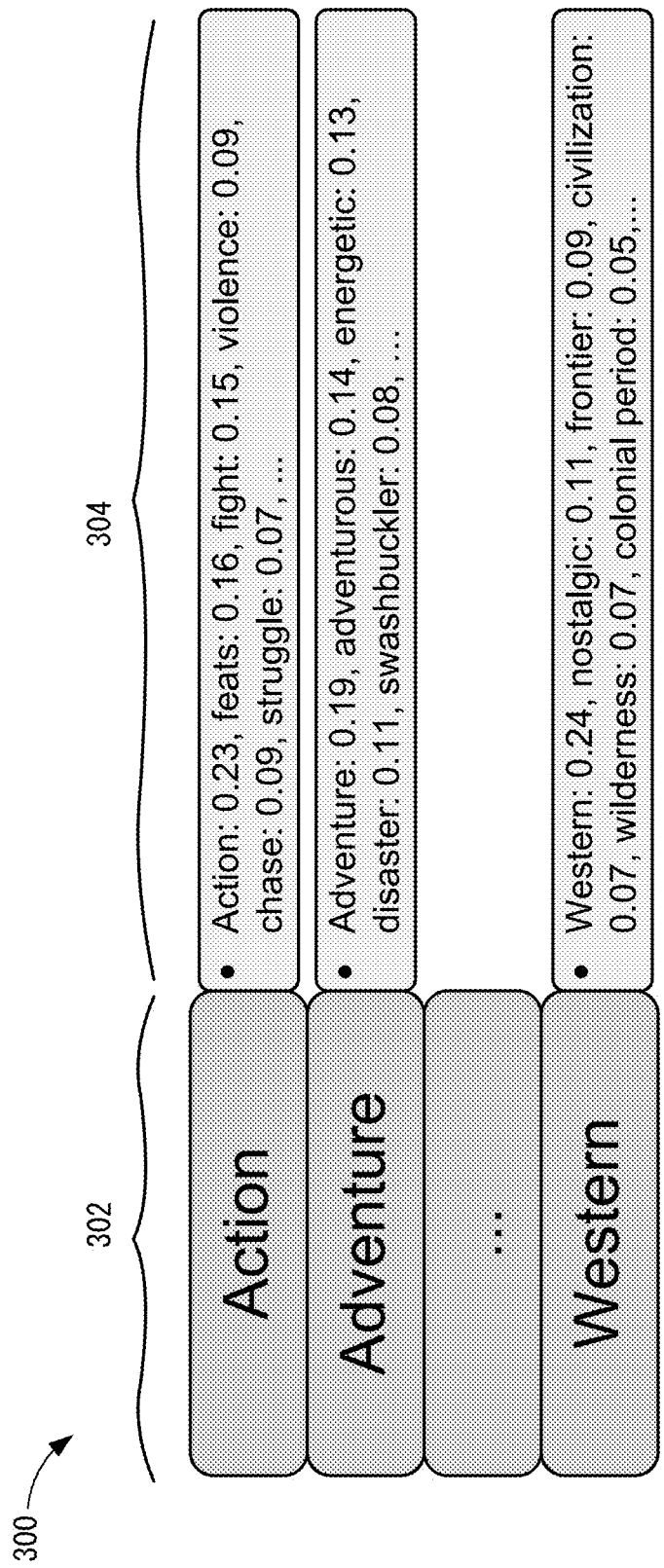
FIG. 3 shows an example of a trained model output according to one embodiment.
Figure 4:
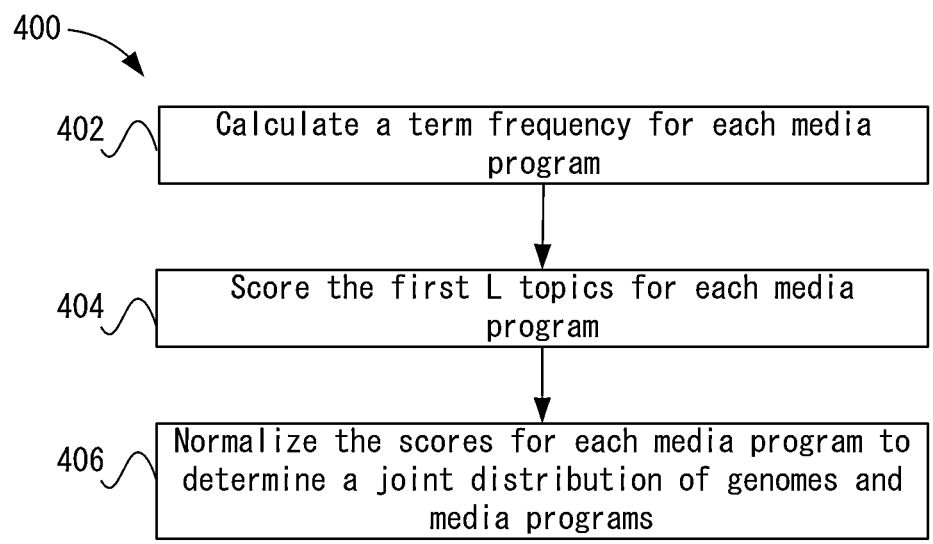
FIG. 4 depicts a simplified flowchart of a method for calculating joint probability distribution of media programs and the genome according to one embodiment.

FIG. 3 shows an example of a trained model output according to one embodiment. At 302, various genre aspects are listed of Action, Adventure, . . . , and Western. Each genre is a topic and corresponds to a genome.

At 304, a distribution of words (e.g., terms) is listed for each genome. The distribution of words includes probabilities that are associated with each word. For example, for the Action genome, the words action: 0.23, feats: 0.16, fight: 0.15, violence: 0.09, chase 0.09, struggle: 0.07, etc. are provided. The numbers after the words represent the contribution (e.g., probability) of the word to the genome. For the term "feats" in the genome Action, the term contributes a 16% probability to the genome Action from the terms listed in the genome Action. Also, in one embodiment, the term action may have been specified for the genome Action in this case as was described in 202 and 204 in FIG. 2, but the topic model may have determined the word "feats" as being part of the topic Action. The topic model uses word co-occurrence information determined from the corpus to determine the words in each topic and the probability distribution. The co-occurrence may be the concurrence/coincidence or the frequent occurrence of two terms from the corpus alongside each other in a certain order. Co-occurrence can be interpreted as an indicator of semantic proximity or an idiomatic expression. The topic model exploits the co-occurrence to determine terms for each topic.

Genome Generation

Once topic model trainer 102 determines the trained topic model, genome determiner 104 may generate the genome for the media programs. FIG. 400 depicts a simplified flowchart of a method for calculating joint probability distribution of media programs and the genome according to one embodiment. At 402, genome determiner 104 calculates a term frequency for each media program. For example, genome determiner 104 determines how many times each word occurs in the textual information for each media program. In one example, genome determiner 104 only determines the term frequency for specific words and not every word in the textual information.

At 404, genome determiner 104 scores the first L topics for each media program. As described above, the number of genomes that was specified is the number L. Thus, genome determiner 104 determines the first L topics corresponding to genomes that are determined for each media program. This narrows the number of topics to the desired number of genomes. The scoring is based on the term frequency and which topics the terms are associated with. For example, a term may occur five times for a video. If that term is found in a topic, then genome determiner 104 scores the topic based on the frequency of five occurrences and the probability for the term assigned by the trained model. For example, 5 occurrences of the word feats yields 5*0.16=0.90 score for the term feats in the topic Action for the media program. In one example, the higher the term frequency means the higher probability the topic is associated with the media program.

At 406, genome determiner 104 normalizes the scores for each media program to determine a joint distribution of genomes and media programs. The normalization removes any popularity skew from the scores that may occur because a media program is popular. For example, a media program may be very popular and thus may have the term frequency be higher. The normalization removes the popularity by considering the marginal distribution of media programs to be uniform. In other words, media programs are equal in front of genome. As described above, each topic is associated with a genome. Thus, the joint distribution of media programs and topics may be the probability that a genome belongs to a media program.

Figure 5A:
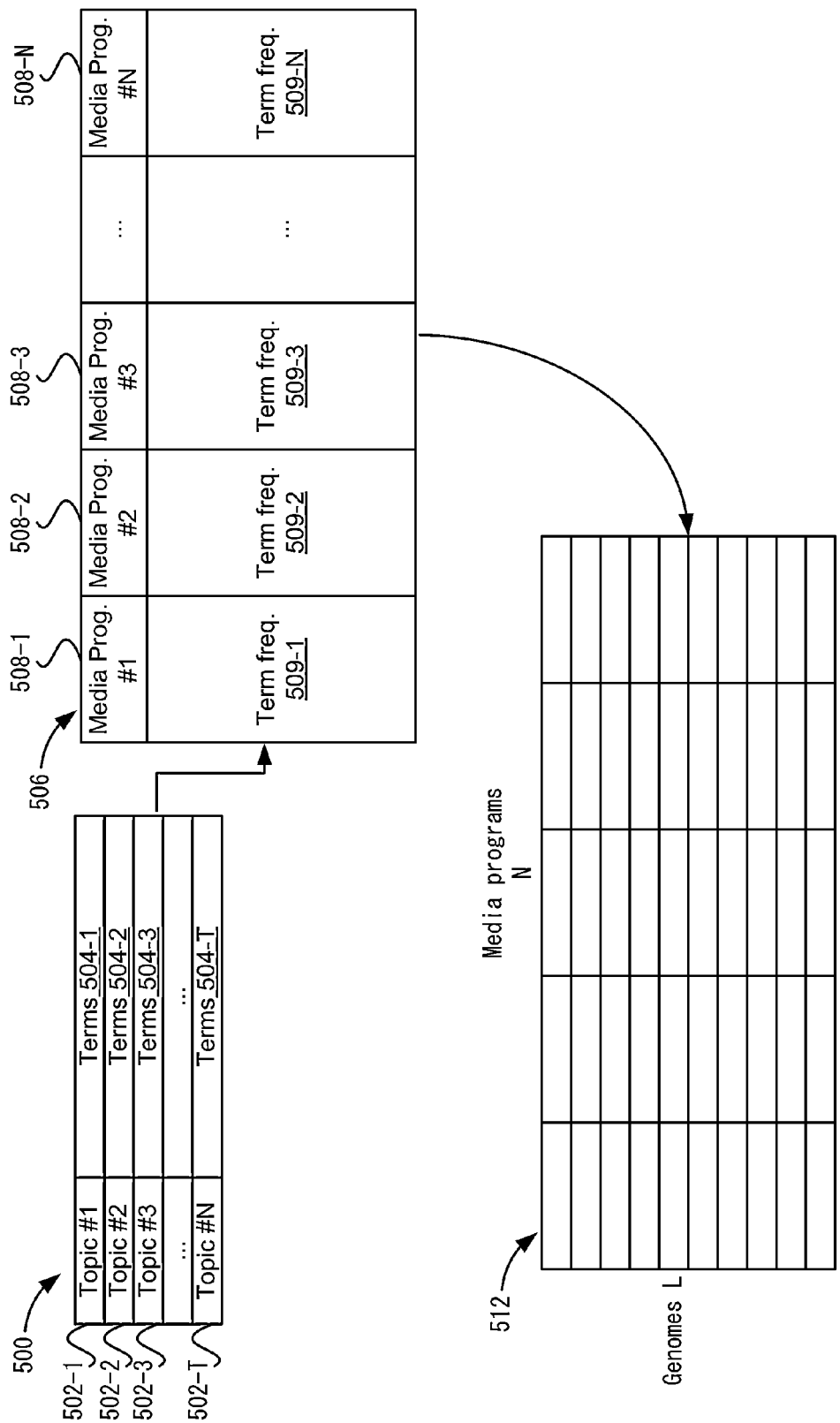
FIG. 5A shows an example of generating the genome according to one embodiment.

FIG. 5A shows an example of generating the genome according to one embodiment. A trained model 500 includes a topic in each row 502-1-502-T. Each topic includes terms 504-1-504-T. For example, the topic in row 502-1 includes terms 504-1. These are terms that the topic model determined were associated with this topic based on an analysis of the textual information for the media programs.

A chart 506 shows a term frequency for each media program. For example, each column 508-1-508-N is associated with a media program and includes the term frequencies 509-1-509-N for multiple terms in each respective media program. In one example, for media program #1, the term "feats" is found 5 times. Also, for media program #2, the term "feats" is found 8 times.

When applying the term frequency to the trained model, genome determiner 104 may multiply the frequency for a term by the probability for the term in the model. Although a multiplication is discussed, other operations may be performed to apply the term frequency to the probability. In one example, if a media program #1 includes five instances of the word feats, then the probability that of feats is increased five times (5*0.16). Also, if a media program #2 includes eight instances of the word feats, then the probability that of feats is increased eight times (8*0.16). This calculation is performed for each of the terms of media program #1 (and all other media programs).

Figure 5B:
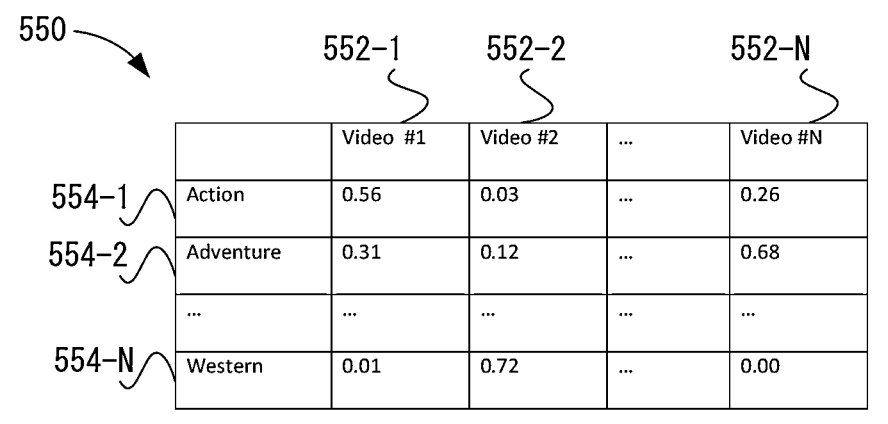

A chart 512 shows a normalization of applying the term frequency to the trained model. As discussed above, the normalization may adjust the values to a common scale to account for irregularities, such as popularity of a media program. Also, chart 512 includes the top L topics. This is the number of genomes that are desired. By relating genomes to topics and documents to media programs, chart 512 provides a joint distribution of genomes and media programs. FIG. 5B shows a chart 550 an example of the joint distribution of genomes and shows according to one embodiment. Columns 552-1, 552-2, ..., 552-N show different videos of Video #1, Video #2, ..., and Video #N. Also, rows 554-1, 554-2, ..., 554-N show different genomes of Action, Adventure, ..., and Western. For each genome, the joint probability distribution for the genome and the media programs is shown. For example, in row 554-1, for the genome Action, the joint probability for Video #1 is 0.56, 0.03 for Video #2, and 0.26 for Video #N. In this case, the genome Action is more likely applicable to Video #1 than Video #2 or Video #N due to having a higher score. The higher score may be due to Video #1 including more terms found in the topic Action, and/or a higher term frequency for the terms found in the topic Action. Also, Video #N may have a higher probability that the genome Adventure is applicable to it due to having a higher score (0.68) than the other videos. The joint distribution is listed for each genome and the media programs.

In one example, a media program may have the words action, adventurous, and energetic in the textual information. In this case, the genome for the joint distribution for the genome of the media program may list action and adventure with a high probability due to the words action, adventurous, and energetic being associated with the media program. However, because no words in the media program found in the western genome in the textual information, the western genome may have a lower probability being associated with the media program.

Example Algorithm

To train the topic model, particular embodiments may use two approaches: variational inference and Gibbs sampling. The algorithm uses Gibbs sampling, but variational inference may be used or other approaches. In Gibbs sampling, the updating rule is the key formulation. The probability of a topic (e.g., a topic index identifying the topic) for a current word ($n^{th}$ words in $d^{th}$ document) $z_n^{(d)}$ given all words W, topic indexes for all words but current word $Z_{-d,n}$, and some hyper-parameters h, i.e. $P(z_n^{(d)}=t|W,Z_{-d,n},h)$, should be updated during the iterative sampling.

The following is a first algorithm to determine the topic model, $$P(z_n^{(d)}=t|W,Z_{-d,n},\alpha,\beta) \propto P(w_n^{(d)}=v|z_n^{(d)}=t,W_{-d,n},Z_{-d,n},\beta)P(z_n^{(d)}=t|Z_{-d,n},\alpha)$$

where the first item on the right is $$P(w_n^{(d)}=v|z_n^{(d)}=t,W_{-d,n},Z_{-d,n},\beta) \propto \frac{N_{v|t}^{-d,n}+\beta/V}{N_t^{-d,n}+\beta}$$

and the second item is $$P(z_n^{(d)}=t|Z_{-d,n},\alpha) \propto \frac{N_{t|d}^{-d,n}+\alpha/T}{N_d-1+\alpha}$$

where $N_{v|t}^{-d,n}$ is the number of words except the current one which are v and belong to topic t, $N_t^{-d,n}$ is the number of words except the current one which belong to topic t. $N_{v|d}^{-d,n}$ is the number of words except the current one which are in document d and belong to topic t. $N_d$ is the number of documents in corpus. T is the number of topics.

The following second algorithm prevents small topics from submerged by large topics. In this case, only the second item is different from the first algorithm:

$$P(z_n^{(d)}=t|Z_{-d,n},\alpha,\alpha') \propto \boxed{\frac{N_{t|d}^{-d,n}+\alpha\frac{N_t^{-d,n}+\alpha'/T}{W-1+\alpha'}}{N_d-1+\alpha}}$$

where W is the number of words in corpus. The second algorithm introduces hyper-parameter $\alpha'$ to relax the model and prevent small topics from submerged by large topics.

The following third algorithm allows words to be associated with topic indexes. In this case, only the first item is different from the first algorithm:

$$P(w_n^{(d)}=v|z_n^{(d)}=t,W_{-d,n},Z_{-d,n},\beta) \propto \frac{N_{v|t}^{-d,n}+\beta/V}{N_t^{-d,n}+\beta}\boxed{\delta(t\in C_n^{(d)})}$$

where $\delta(t\in C_n^{(d)})$ restricts $z_n^{(d)}=t$ to a subset of values $C_n^{(d)}$ which is a set of topic indexes. In other words, the $n^{th}$ words in $d^{th}$ document should only belong to topics in $C_n^{(d)}$. Thus, the third algorithm associates words with topic indexes.

The following fourth algorithm allows domain knowledge to be incorporated into the model and also relationships between words can be specified. In this case, only the first item is different from the first algorithm:

$$P(w_n^{(d)}=v|z_n^{(d)}=t,W_{-d,n},Z_{-d,n},q_{1:T}) \propto \boxed{\prod_{s\in I_i(\uparrow i)} \frac{\gamma_t^{C_i(s\downarrow i)}+n_{-i,t}^{C(s\downarrow i)}}{\Sigma_{k\in C_i(s)}(\gamma_t^{(k)}+n_{-i,t}^{(k)})}}$$

where i is the global index of the $n^{th}$ words in $d^{th}$ document, and $q_{1:T}$ are Dirichlet trees modeled by $\gamma$ and $\beta$. $I_t(\uparrow i)$ denotes the subset of internal nodes in topic t's Dirichlet tree that are ancestor of leaf $w_i$. $C_t(s \downarrow i)$ is the unique node that is s's immediate child and an ancestor of $w_i$ (including $w_i$ itself). The fourth algorithm adopts Dirichlet forest as prior distribution of parameter ϕ (which is the word distribution of each topic) instead of Dirichlet distribution. Thus, domain knowledge can be incorporated into the topic model. For example, particular embodiments can specify that 'apple' and 'orange' co-occur with a high probability in a same topic, and 'apple' and 'football' do not to co-occur in a same topic. Different rules of domain knowledge lead to different tree structures.

Particular embodiments combine algorithms 2, 3, and 4 into one:
The first item is the combination of those of third algorithm and the fourth algorithm:

$$P(w_n^{(d)} = v \mid z_n^{(d)} = t, W_{-d,n}, Z_{-d,n}, q_{1:T}) \propto \prod_{s \in I_t(\uparrow i)} \frac{\gamma_t^{C_t(s \downarrow i)} + n_{-i,t}^{C_t(s \downarrow i)}}{\sum_{k \in C_t(s)} (\gamma_t^{(k)} + n_{-i,t}^{(k)})} \delta(t \in C^{(i)})$$

and the second item is that of second algorithm:

$$P(z_n^{(d)} = t \mid Z_{-d,n}, \alpha, \alpha') \propto \frac{N_{t|d}^{-d,n} + \alpha \frac{N_t^{-d,n} + \alpha'/T}{W - 1 + \alpha'}}{N_d - 1 + \alpha}$$

Thus, the updating rule of the topic model based on the first algorithm becomes:

$$P(z_n^{(d)} = t \mid W, Z_{-d,n}, h)$$
$$\propto P(z_n^{(d)} = t \mid Z_{-d,n}, \alpha, \alpha') P(w_n^{(d)} = v \mid z_n^{(d)} = t, W_{-d,n}, Z_{-d,n}, q_{1:T})$$

$$\propto \boxed{\frac{N_{t|d}^{-d,n} + \alpha \frac{N_t^{-d,n} + \alpha'/T}{W - 1 + \alpha'}}{N_d - 1 + \alpha}} \boxed{\prod_{s \in I_t(\uparrow i)} \frac{\gamma_t^{C_t(s \downarrow i)} + n_{-i,t}^{C_t(s \downarrow i)}}{\Sigma_{k \in C_t(s)}(\gamma_t^{(k)} + n_{-i,t}^{(k)})} \delta(t \in C^{(i)})}$$

System Overview

Figure 6:
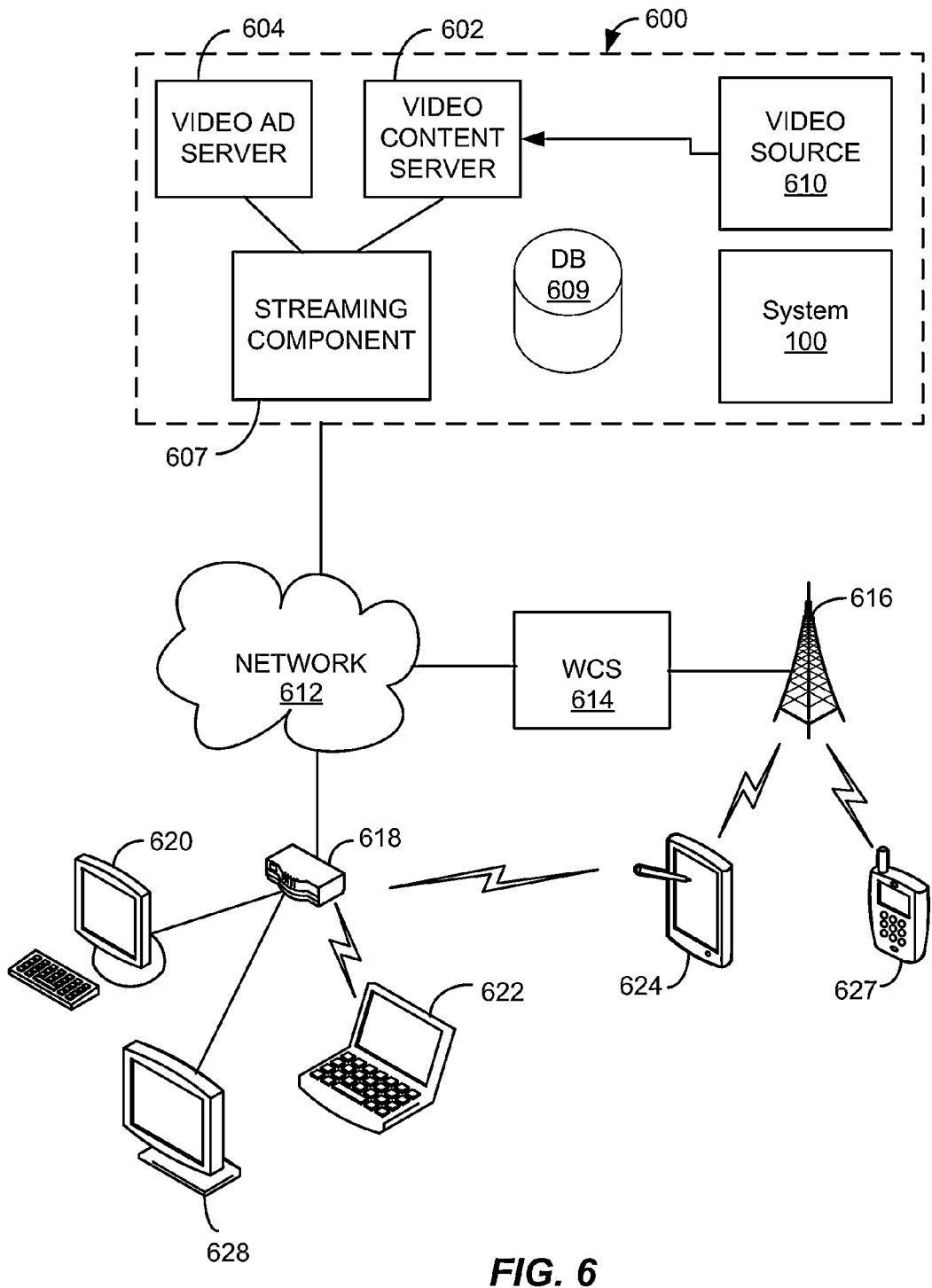
FIG. 6 depicts a video streaming system in communication with multiple client devices via one or more communication networks according to one embodiment.

Features and aspects as disclosed herein may be implemented in conjunction with a video streaming system 600 in communication with multiple client devices via one or more communication networks as shown in FIG. 6. Aspects of the video streaming system 600 are described merely to provide an example of an application for enabling distribution of content prepared according to the present disclosure. It should be appreciated that the present technology is not limited to streaming video applications, and may be adapted for other applications.

Video data may be obtained from one or more sources for example, from a video source 610, for use as input to a video content server 602. The input video data may comprise raw or edited frame-based video data in any suitable digital format, for example, MPEG-1, MPEG-2, MPEG-4, VC-1, or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers.

The video streaming system 600 may include one or more computer servers or modules 602, 604, and/or 607 distributed over one or more computers. Each server 602, 604, 607 may include, or may be operatively coupled to, one or more data stores 609, for example databases, indexes, files, or other data structures. A video content server 602 may access a data store (not shown) of various video segments. The video content server 602 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 604 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 600, a public service message, or some other information. The video advertising server 604 may serve the video advertising segments as directed by a user interface controller (not shown).

The video streaming system 600 also may include system 100 for determining the genome for the media programs.

The video streaming system 600 may further include an integration and streaming component 607 that integrates video content and video advertising into a streaming video segment. For example, streaming component 607 may be a content server or streaming media server. A controller (not shown) may determine the selection or configuration of advertising in the streaming video based on any suitable algorithm or process. The video streaming system 600 may include other modules or units not depicted in FIG. 6, for example administrative servers, commerce servers, network infrastructure, advertising selection engines, and so forth.

The video streaming system 600 may connect to a data communication network 612. A data communication network 612 may comprise a local area network (LAN), a wide area network (WAN), for example, the Internet, a telephone network, a wireless cellular telecommunications network (WCS) 614, or some combination of these or similar networks.

One or more client devices may be in communication with the video streaming system 600, via the data communication network 612 and/or other network 614. Such client devices may include, for example, one or more laptop computers 622, desktop computers 620, "smart" mobile phones 627, notepad devices 624, network-enabled televisions 628, or combinations thereof, via a router 618 for a LAN, via a base station 616 for a wireless telephony network 614, or via some other connection. In operation, such client devices 620, 622, 624, 627, or 628 may send and receive data or instructions to the system 600, in response to user input received from user input devices or other input. In response, the system 600 may serve video segments and metadata from the data store 609 responsive to selection of interactive links to the client devices 620, 622, 624, 627, or 628 and customize the additional content based on parameters of the client devices, for example respective geographic locations of the client devices, or demographic information concerning respective users of the client devices. The devices 620, 622, 624, 627, or 628 may output interactive video content from the streaming video segment using a display screen, projector, or other video output device, and receive user input for interacting with the video content.

Distribution of audio-video data may be implemented from streaming component 607 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Unlike the web server, the streaming component 607 may communicate with the client device using control messages and data messages to adjust to changing network conditions as the video is played. These control messages can include commands for enabling control functions such as fast forward, fast reverse, pausing, or seeking to a particular part of the file at the client.

Since streaming component 607 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 607 may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming component 607 can also deliver live webcasts and can multicast, which allows more than one client to tune into a single stream, thus saving bandwidth. Streaming media players may not rely on buffering to provide random access to any point in the media program. Instead, this is accomplished through the use of control messages transmitted from the media player to the streaming media server. Another protocol used for streaming is hypertext transfer protocol (HTTP) live streaming (HLS). The HLS protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of each video program, for example, using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Output from a media player on the client device may occupy only a portion of total screen area available on a client device, particularly when bandwidth limitations restrict the resolution of streaming video. Although media players often include a "full screen" viewing option, many users prefer to watch video in a display area smaller than full screen, depending on the available video resolution. Accordingly, the video may appear in a relatively small area or window of an available display area, leaving unused areas. A video provider may occupy the unused area with other content or interface objects, including additional advertising, such as, for example, banner ads. Banner ads or similar additional content may be provided with links to an additional web site or page, so that when a user "clicks on" or otherwise selects the banner ad, the additional web site or page opens in a new window.

Figure 7:
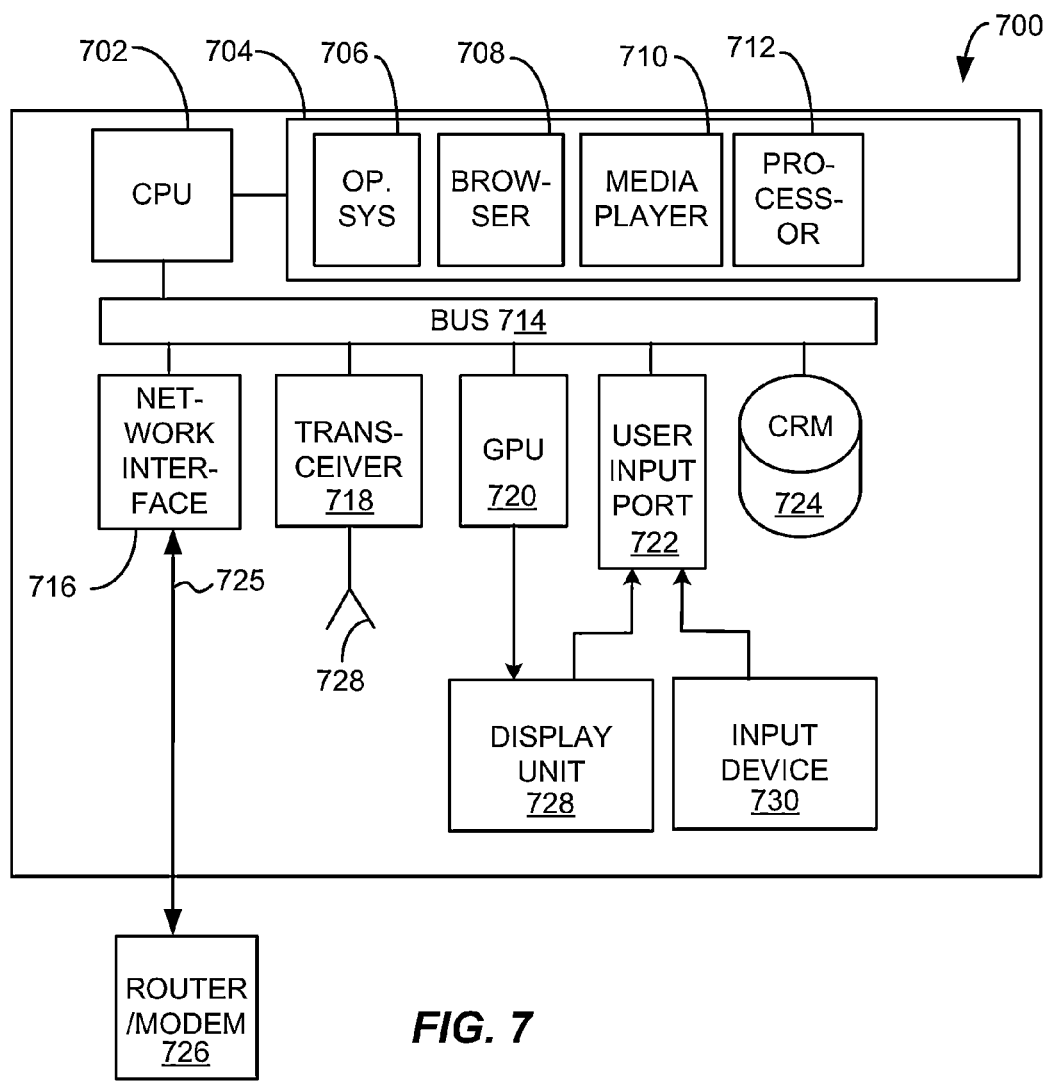
FIG. 7 depicts a diagrammatic view of an apparatus for viewing video content and advertisements.

Referring to FIG. 7, a diagrammatic view of an apparatus 700 for viewing video content and advertisements is illustrated. In selected embodiments, the apparatus 700 may include a processor (CPU) 702 operatively coupled to a processor memory 704, which holds binary-coded functional modules for execution by the processor 702. Such functional modules may include an operating system 706 for handling system functions such as input/output and memory access, a browser 708 to display web pages, and media player 710 for playing video. The memory 704 may hold additional modules not shown in FIG. 7, for example modules for performing other operations described elsewhere herein.

A bus 714 or other communication component may support communication of information within the apparatus 700. The processor 702 may be a specialized or dedicated microprocessor configured to perform particular tasks in accordance with the features and aspects disclosed herein by executing machine-readable software code defining the particular tasks. Processor memory 704 (e.g., random access memory (RAM) or other dynamic storage device) may be connected to the bus 714 or directly to the processor 702, and store information and instructions to be executed by a processor 702. The memory 704 may also store temporary variables or other intermediate information during execution of such instructions.

A computer-readable medium in a storage device 724 may be connected to the bus 714 and store static information and instructions for the processor 702; for example, the storage device (CRM) 724 may store the modules 706, 708, 710 and 712 when the apparatus 700 is powered off, from which the modules may be loaded into the processor memory 704 when the apparatus 700 is powered up. The storage device 724 may include a non-transitory computer-readable storage medium holding information, instructions, or some combination thereof, for example instructions that when executed by the processor 702, cause the apparatus 700 to be configured to perform one or more operations of a method as described herein.

A communication interface 716 may also be connected to the bus 714. The communication interface 716 may provide or support two-way data communication between the apparatus 700 and one or more external devices, e.g., the streaming system 600, optionally via a router/modem 726 and a wired or wireless connection 725. In the alternative, or in addition, the apparatus 700 may include a transceiver 718 connected to an antenna 728, through which the apparatus 700 may communicate wirelessly with a base station for a wireless communication system or with the router/modem 726. In the alternative, the apparatus 700 may communicate with a video streaming system 600 via a local area network, virtual private network, or other network. In another alternative, the apparatus 700 may be incorporated as a module or component of the system 600 and communicate with other components via the bus 714 or by some other modality.

The apparatus 700 may be connected (e.g., via the bus 714 and graphics processing unit 720) to a display unit 728. A display 728 may include any suitable configuration for displaying information to an operator of the apparatus 700. For example, a display 728 may include or utilize a liquid crystal display (LCD), touchscreen LCD (e.g., capacitive display), light emitting diode (LED) display, projector, or other display device to present information to a user of the apparatus 700 in a visual display.

One or more input devices 730 (e.g., an alphanumeric keyboard, microphone, keypad, remote controller, game controller, camera or camera array) may be connected to the bus 714 via a user input port 722 to communicate information and commands to the apparatus 700. In selected embodiments, an input device 730 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 728, for example using a touch sensitive screen. A cursor control device may communicate direction information and command selections to the processor 702 and control cursor movement on the display 728. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   defining, by a computing device, information for a set of genomes, the set of genomes describing characteristics of media programs;
   defining, by the computing device, which genomes in the set of genomes correspond to which topics in a set of topics;
   inputting, by the computing device, textual information for a plurality of media programs and the information for the set of genomes into a model;
   training, by the computing device, the model to determine a probability distribution of terms for the set of topics based on analyzing the textual information and the information for the set of genomes, wherein training comprises incorporation a parameter that prevents topics from being submerged by other topics that are larger via a first item in the model; and
   outputting, by the computing device, the trained model, wherein the probability distribution of terms is usable to determine genomes for each of the plurality of media programs, wherein a genome corresponds to a topic and is associated with a media program based on terms found in the textual information for the media program and the probability distribution of terms for the topic corresponding to the genome.

2. The method of claim 1, further comprising scoring, by the computing device, terms for each of the plurality of media programs based on the trained model to rank topics for each media program.

3. The method of claim 2, wherein scoring comprises:
   determining, by the computing device, a term frequency for terms found in the textual information for each media program; and
   scoring, by the computing device, the topics for each media program based on the probability distribution of terms for the set of topics in the trained model and the corresponding term frequency.

4. The method of claim 3, further comprising normalizing, by the computing device, the scoring of the topics.

5. The method of claim 3, further comprising selecting, by the computing device, a number of highest scored topics for each media program as the genomes for each media program.

6. The method of claim 1, wherein a joint distribution function of a plurality of media programs and the genomes is determined.

7. The method of claim 6, wherein the joint distribution function comprises a joint probability the genome applies to the media program among the plurality of media programs.

8. The method of claim 1, wherein the textual information describes the media program based on content of the media program.

9. The method of claim 1, wherein defining information for the set of genomes comprises defining, by the computing device, the parameter for the model such that smaller topics are not submerged by larger topics.

10. The method of claim 1, wherein defining information for the set of genomes comprises defining, by the computing device, a term that is associated with a topic based on domain knowledge.

11. The method of claim 1, wherein defining information for the set of genomes comprises defining, by the computing device, terms that co-occur in a topic or cannot occur in the topic based on domain knowledge.

12. The method of claim 1, wherein training the model comprises determining, by the computing device, other terms to associate with the set of topics based on term co-occurrence in the textual information.

13. The method of claim 1, wherein the model comprises:

$$P(z_n^{(d)} = t \mid W, Z_{-d,n}, h)$$

$$\propto P(z_n^{(d)} = t \mid Z_{-d,n}, \alpha, \alpha') P(w_n^{(d)} = v \mid z_n^{(d)} = t, W_{-d,n}, Z_{-d,n}, q_{1:T})$$

$$\propto \frac{N_{t \mid d}^{-d,n} + \alpha \frac{N_t^{-d,n} + \alpha'/T}{W - 1 + \alpha'}}{N_d - 1 + \alpha} \prod_{s \in I_t(\uparrow i)} \frac{\gamma_t^{C_t(s \downarrow i)} + n_{-i,t}^{C_t(s \downarrow i)}}{\sum_{k \in C_t(s)} \left( \gamma_t^{(k)} + n_{-i,t}^{(k)} \right)} \delta(t \in C^{(i)})$$

where Z is a current word, n is an $n^{th}$ word, d is a $d^{th}$ document, t is a topic, W is a number of words in a corpus, h is a hyper-parameter, T is a number of topics, and C is a set of topic indexes.

14. The method of claim 1, wherein training comprises: incorporating words that belong to the topic in the model via a second item in the model.

15. The method of claim 14, wherein training comprises: incorporating relationships between words that are associated with topics via a third item in the model.

16. A non-transitory computer-readable storage medium containing instructions, that when executed, control a computer system to be configured for:
defining information for a set of genomes, the set of genomes describing characteristics of media programs;
defining which genomes in the set of genomes correspond to which topics in a set of topics;
inputting textual information for a plurality of media programs and the information for the set of genomes into a model;
training the model to determine a probability distribution of terms for the set of topics based on analyzing the textual information and the information for the set of genomes, wherein training comprises incorporating a parameter that prevents topics from being submerged by other topics that are larger via a first item in the model; and
outputting the trained model, wherein the probability distribution of terms is usable to determine genomes for each of the plurality of media programs, wherein a genome corresponds to a topic and is associated with a media program based on terms found in the textual information for the media program and the probability distribution of terms for the topic corresponding to the genome.

17. The non-transitory computer-readable storage medium of claim 16, further configured for scoring terms for each of the plurality of media programs based on the trained model to rank topics for each media program.

18. The non-transitory computer-readable storage medium of claim 17, wherein scoring comprises:
determining a term frequency for terms found in the textual information for each media program; and
scoring the topics for each media program based on the probability distribution of terms for the set of topics in the trained model and the corresponding term frequency.

19. The non-transitory computer-readable storage medium of claim 18, further comprising selecting a number of highest scored topics for each media program as the genomes for each media program.

20. The non-transitory computer-readable storage medium of claim 16, wherein the model is configured such that smaller topics are not submerged by larger topics.

21. The non-transitory computer-readable storage medium of claim 16, wherein defining information for the set of genomes comprises defining a term that is associated with a topic based on domain knowledge.

22. The non-transitory computer-readable storage medium of claim 16, wherein defining information for the set of genomes comprises defining terms that co-occur in a topic or cannot occur in the topic based on domain knowledge.

23. An apparatus comprising:
one or more computer processors; and
a non-transitory computer-readable storage medium comprising instructions, that when executed, control the one or more computer processors to be configured for:
defining information for a set of genomes, the set of genomes describing characteristics of media programs;
defining which genomes in the set of genomes correspond to which topics in a set of topics;
inputting textual information for a plurality of media programs and the information for the set of genomes into a model;
training the model to determine a probability distribution of terms for the set of topics based on analyzing the textual information and the information for the set of genomes, wherein training comprises incorporating a parameter that prevents topics from being submerged by other topics that are larger via a first item in the model; and
outputting the trained model, wherein the probability distribution of terms is usable to determine genomes for each of the plurality of media programs, wherein a genome corresponds to a topic and is associated with a media program based on terms found in the textual information for the media program and the probability distribution of terms for the topic corresponding to the genome.

* * * * *